(No Model.) 2 Sheets—Sheet 1.

J. W. PILE.
DELIVERY WAGON.

No. 527,806. Patented Oct. 23, 1894.

WITNESSES:

INVENTOR
John W. Pile.
BY
Chester Bradford,
ATTORNEY.

(No Model.)　　　　　　　　　　　　　　　　　　　2 Sheets—Sheet 2.
J. W. PILE.
DELIVERY WAGON.
No. 527,806.　　　　　　　　　　　　　　Patented Oct. 23, 1894.
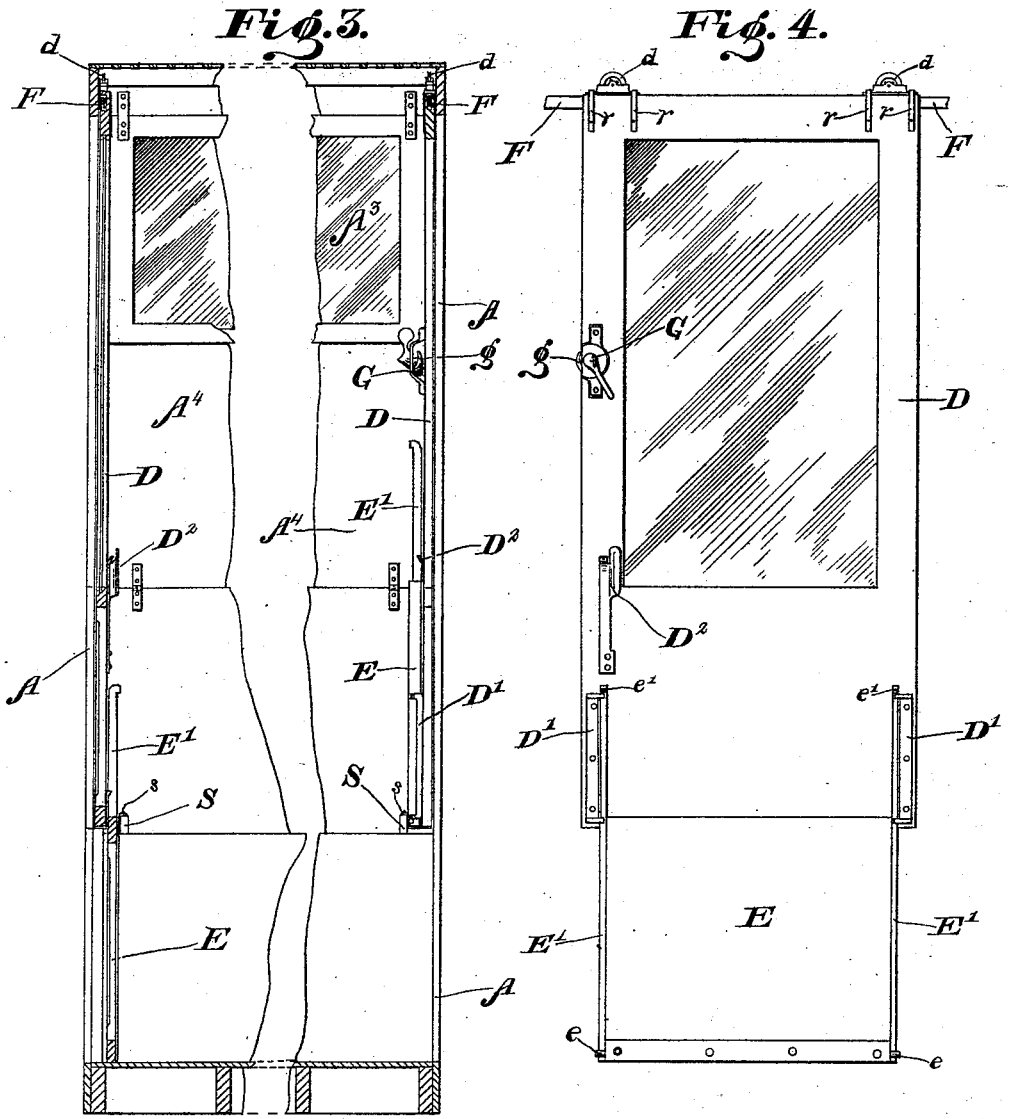
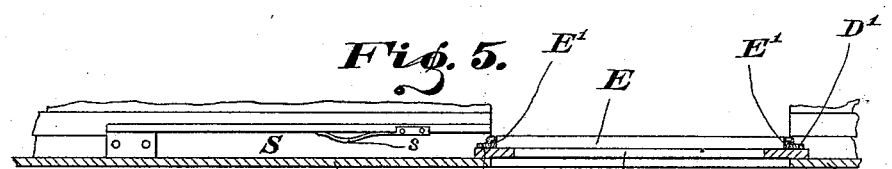
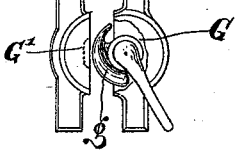
WITNESSES:　　　　　　　　　　　　　　　　　INVENTOR
　Edgar A. Kingsley.　　　　　　　　　　　　John W. Pile.
　James A. Walsh.　　　　　　　　　　BY Chester Bradford,
　　　　　　　　　　　　　　　　　　　　　ATTORNEY.
THE NORRIS PETERS CO., PHOTO-LITHO., WASHINGTON, D. C.

UNITED STATES PATENT OFFICE.

JOHN W. PILE, OF MARIETTA, INDIANA.

DELIVERY-WAGON.

SPECIFICATION forming part of Letters Patent No. 527,806, dated October 23, 1894.

Application filed July 17, 1894. Serial No. 517,777. (No model.)

*To all whom it may concern:*

Be it known that I, JOHN W. PILE, a citizen of the United States, residing at Marietta, in the county of Shelby and State of Indiana, have invented certain new and useful Improvements in Delivery-Wagons, of which the following is a specification.

My invention relates to that class of vehicles known as "delivery wagons" or "milk wagons;" and it consists in certain means whereby such a vehicle may be provided with a downward drop in the center, thus bringing the feet of the driver nearer the ground, and facilitating the handling of the contents of the vehicle and the passing of them in and out, and at the same time providing a door which will not interfere with the convenient use of the vehicle, and will completely close the door opening when required.

A vehicle provided with my improvements will be first fully described and the novel features thereof then pointed out in the claims.

Figure 1:
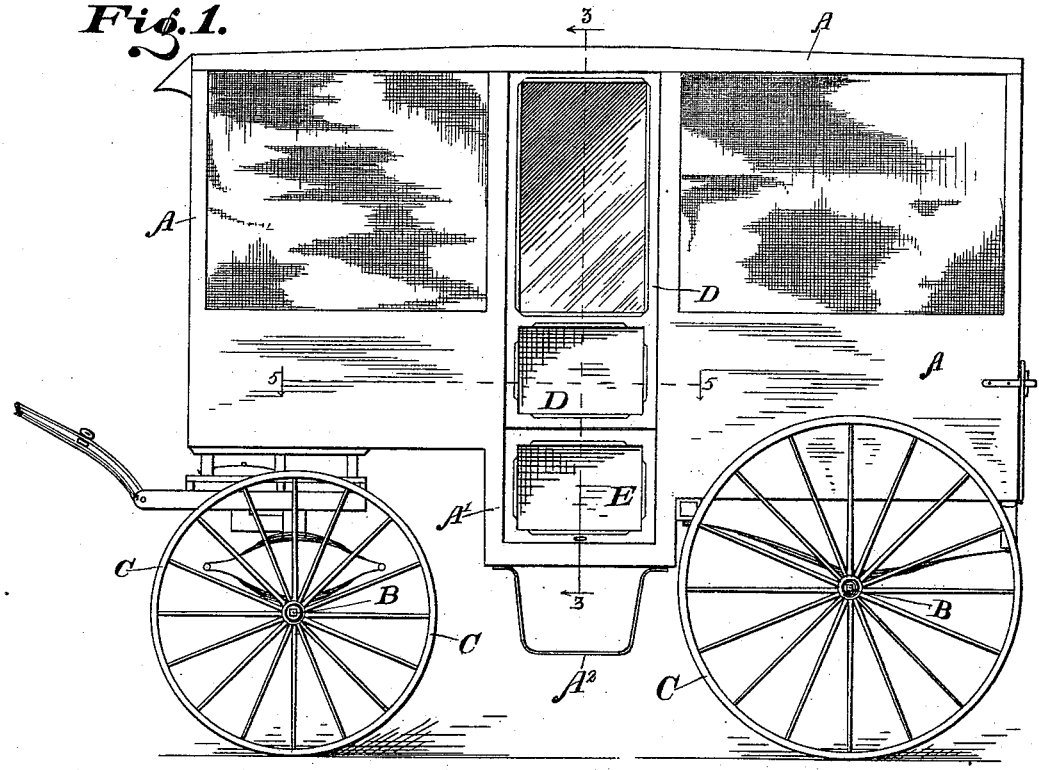
Figure 2:
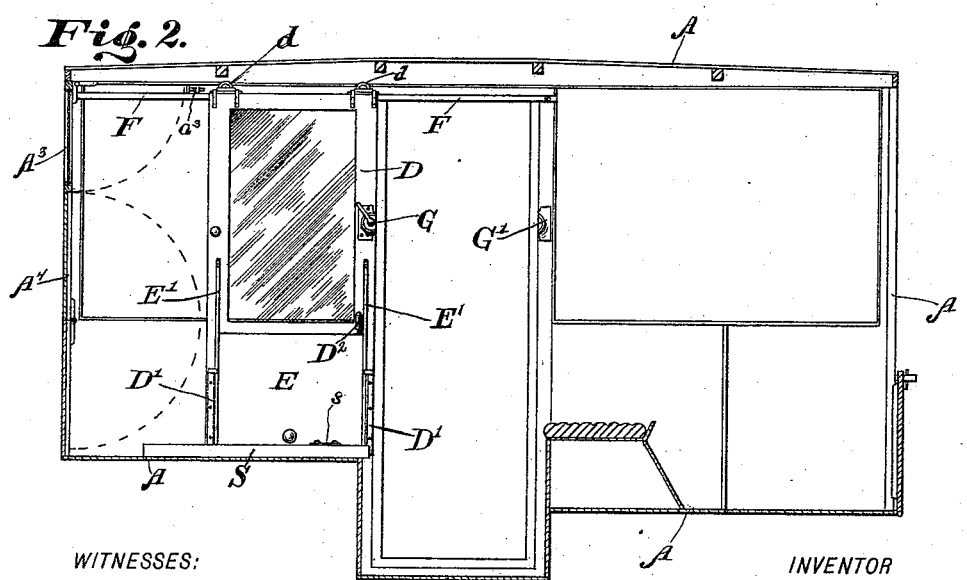

Referring to the accompanying drawings, which are made a part hereof, and on which similar letters of reference indicate similar parts, Figure 1 is a side elevation of a vehicle embodying my improvements; Fig. 2, a longitudinal vertical sectional view of the vehicle body; Fig. 3 a, transverse sectional view of said body, on an enlarged scale, as seen from the dotted line 3 3 in Fig. 1, the door on one side being shown as open, and on the other side shown as closed, while the middle portion between the doors is broken away for economy of space; Fig. 4, an inside elevation of the door separately, also on an enlarged scale; Fig. 5, a horizontal sectional view through one side of the vehicle, including one door, as seen from the dotted line 5 5 in Fig. 1, and Fig. 6 a view on a still larger scale of the door fastener, with portions of its casing broken away.

In said drawings the portions marked A represent the body of the vehicle; B, the axles; C, the wheels; D, the upper or main portion of the door; E, the lower or extension portion of the door; F, the rail on which the door is hung, and G a fastener attached to the front edge of the door.

The body A of the vehicle may in its general construction be such as is desired. At the center it extends down between the wheels lower than the remainder of the bottom, and this downward extension A' is for the feet of the occupant or driver, and thus brings him nearer to the ground than is usual, and permits greater freedom of movement on his part than would otherwise be the case, as he can stand more nearly straight in handling the contents of the vehicle. A step $A^2$ may be provided for convenience in mounting and dismounting.

The front end of the body A has two folding sections $A^3$ and $A^4$, the upper one of which is provided with a glass panel, so that the driver can see through it when closed, and which is adapted to swing upwardly as indicated by the dotted line in Fig. 2, and be held by a catch $a^3$ when it is desired to have said panel open. The other panel $A^4$ may swing downwardly, as indicated by the dotted line in Fig. 2, and rest closely inside the lower portion of the front end of the vehicle body entirely out of the way. When these sections $A^3$ and $A^4$ are both open, two-thirds of the front end of the vehicle body is without obstruction, and this may be partly or wholly closed as desired, by swinging one or the other or both these sections $A^3$ $A^4$ shut, as will be readily understood.

The axles B and wheels C are or may be of a usual and well known variety, and need no special description.

The door D is a sliding door, and is provided with hanger trucks $d$ which rest upon the track F and thus carry the door, said hanger trucks being secured to the door in any desired manner, as by metal straps $r$ passing over the ends of the truck-housings. As shown in Fig. 3, they are preferably of a variety which enables the location of the track F to be such that it passes through a groove in the upper edge of the door, as this is a more secure construction, and occupies less space. Ways D' are secured to the lower end of this door to receive and guide the slides E' on the lower door portion E, and a spring catch $D^2$ is provided to engage with one of said slides and support said portion E when raised.

The door portion E is of such a size that it may be employed to cover the opening that would otherwise exist below the door D, in the downward extension A' of the body A, and is adapted to move vertically on said door D, and is thus enabled to be raised so as to be moved to one side with said door D, or to be dropped into position when the door is closed. It is provided with slides E' which engage with the ways D' on the doors D, and thus move up and down therein. Stops $e$ prevent too great an ascent; and projections $e'$ on the upper ends of the slides E' prevent too great a descent;—the parts being so proportioned and attached that the movement is limited to that which is required for the purpose stated. One of the slides E' is notched in that side which comes next the door D, and when it is raised to the utmost limit, this notch reaches that position which enables it to engage with the spring-catch $D^2$ on the door D, thus sustaining the door portion E in its upper position until said spring catch is disengaged, which may be done by simply pushing upon the same, from the inside, by the occupant of the vehicle. Slide-ways S are formed on the inside of the body A, which are of sufficient size and are suitably proportioned to receive the lower end of the door when the lower portion is raised. Inside these ways are springs $s$, which serve, when the door is slid back, to press upon the inner surface thereof, and thus prevent it from shaking or moving about. These ways S, as will be observed, are for the double thickness door composed of the two parts D and E. The upper end of the part D is mounted upon the track F, and the structure as a whole is thus secured from vibratory movement both at the bottom and at the top.

The fastener G serves a double purpose. It secures the door shut, and also forces it tightly against its jamb. To accomplish this its tongue is hook-shaped, and, also, is tapering in both directions. It is thus enabled to engage with the part G' secured to the door frame, circling around the appropriate portion thereof as it is turned, and thus draw the door tightly against the jamb edgewise, while its tapering or wedge-shaped formation also forces the door tightly against the jamb outwardly, thus closing it very tightly, and preventing shaking and rattling, while holding it securely shut.

The operation is as follows: Assuming the doors of the vehicle to be open, the driver enters, and, desiring to close said doors or either of them, moves either or both from the position shown in Fig. 2 and at the right of Fig. 3, to the position shown in Figs. 1, 4 and 5 and at the left of Fig. 3. He then presses upon the spring-catch $D^2$, disengaging it from the slide E', which permits the door section E to slide downwardly to its lower position, closing the opening otherwise existing below the door in the downward extension A' of the vehicle body. The fastener G is then manipulated, which secures the door rigidly and tightly in place, as previously explained. When it is desired to open these doors or either of them, the operation is reversed. The fastener G is disengaged, the lower door section E is raised until the spring-catch $D^2$ is in engagement, and the door is pushed back into the slide-way S behind the spring $s$;—said spring serving the purpose, when the door is in this position, of keeping the door from shaking or rattling. As before explained, the stops $e$ and $e'$ limit the vertical movement of the door portion E.

Having thus fully described my said invention, what I claim as new, and desire to secure by Letters Patent, is—

1. The combination, with a vehicle body having a central downward extension, of a sliding door D having a lower portion E attached thereto and adapted to move vertically thereon, substantially as and for the purposes set forth.

2. The combination, with a vehicle body having a downward extension in the center, of the door D, mounted on a track F at the top, provided with a vertically-sliding lower portion E, said vehicle body having a slide-way S inside thereof adapted to receive the lower edge of the door when said lower portion is raised, substantially as set forth.

3. A vehicle door, consisting of the upper portion D having slide-ways D' secured thereto, and a lower portion E adapted to slide vertically thereon and provided with slides E', and having stops $e$ and $e'$ for limiting the vertical movement of said lower portion, substantially as described.

4. The combination, with a vehicle, of a door consisting of two portions, one adapted to slide vertically on the other, a track on which the whole door is adapted to slide sidewise, devices by which the two door portions are united and adapted to slide one upon the other, and a fastener by which the door is drawn closely against its jamb when closed, the tongue of said fastener being wedge-shaped, substantially as described.

In witness whereof I have hereunto set my hand and seal, at Marietta, Indiana, this 13th day of July, A. D. 1894.

JOHN W. PILE. [L. S.]

Witnesses:
WILLIAM D. STEWART,
WILLIAM SNYDER.